(12) United States Patent
Gabor et al.

(10) Patent No.: US 9,567,549 B2
(45) Date of Patent: Feb. 14, 2017

(54) PROCESS FOR DEODORIZING EDIBLE OIL

(75) Inventors: Juergen Gabor, Erzhausen (DE); Steffen Reichwein, Gross-Umstadt (DE)

(73) Assignee: AIR LIQUIDE GLOBAL E&C SOLUTIONS GERMANY GMBH, Frankfurt am Main (DE)

( * ) Notice: Subject to any disclaimer, the term of this patent is extended or adjusted under 35 U.S.C. 154(b) by 1077 days.

(21) Appl. No.: 13/583,112

(22) PCT Filed: Dec. 24, 2010

(86) PCT No.: PCT/DE2010/001522
§ 371 (c)(1),
(2), (4) Date: Dec. 20, 2012

(87) PCT Pub. No.: WO2011/103846
PCT Pub. Date: Sep. 1, 2011

(65) Prior Publication Data
US 2013/0084375 A1    Apr. 4, 2013

(30) Foreign Application Priority Data
Feb. 26, 2010  (DE) .................. 10 2010 009 579

(51) Int. Cl.
C11B 3/14  (2006.01)
B01D 3/10  (2006.01)
B01D 5/00  (2006.01)
C11B 3/12  (2006.01)

(52) U.S. Cl.
CPC . C11B 3/14 (2013.01); B01D 3/10 (2013.01); B01D 5/006 (2013.01); C11B 3/12 (2013.01)

(58) Field of Classification Search
None
See application file for complete search history.

(56) References Cited

U.S. PATENT DOCUMENTS

| | | | | |
|---|---|---|---|---|
| 2,621,196 A * | 12/1952 | Thurman | .................. | C11B 3/14 159/18 |
| 4,036,865 A * | 7/1977 | Hartmann | ................. | C11B 3/14 165/108 |
| 5,241,092 A * | 8/1993 | Cheng | ....................... | C11B 3/14 554/205 |
| 6,750,359 B1 * | 6/2004 | Copeland | .................. | C07J 9/00 554/205 |
| 6,953,499 B2 | 10/2005 | Kellens et al. | | |
| 7,597,783 B2 * | 10/2009 | Kruidenberg | .......... | B01D 1/305 202/186 |
| 7,670,634 B2 * | 3/2010 | Kellens | .................. | B01D 3/346 426/487 |
| 2004/0030166 A1 * | 2/2004 | Copeland et al. | ............ | 552/545 |
| 2004/0253353 A1 | 12/2004 | Copeland et al. | | |

FOREIGN PATENT DOCUMENTS

| | | |
|---|---|---|
| DE | 2039531 A1 | 2/1972 |
| DE | 2051999 A1 | 5/1972 |
| DE | 60115605 T2 | 9/2006 |
| DE | 60306515 T2 | 6/2007 |
| EP | 0127982 A1 | 12/1984 |
| EP | 1465968 B1 | 11/2006 |
| WO | 03020860 A2 | 3/2003 |
| WO | 2006118517 A1 | 11/2006 |

OTHER PUBLICATIONS

Singer, M.: Gewinnung und Verarbeitung der pflanzlichen Fette und Öle; Verlag für chemische Industrie, H. Ziolkowsky KG, Augsburg 1992, pp. 234-238.
European Patent Office, International Search Report in International Patent Application No. PCT/DE2010/01522 (May 23, 2011).

* cited by examiner

Primary Examiner — Nikki H Dees
Assistant Examiner — Amber Cox
(74) Attorney, Agent, or Firm — Leydig, Voit & Mayer, Ltd.

(57) ABSTRACT

A process for deodorizing edible oil in a plant includes generating a vacuum in the plant and filling a degassing stage with edible oil which passes through the degassing and separating stages in succession and is treated concurrently with stripping steam; and heating the batch in the separating stages of the stripping column's upper section to 150 to 180° C., middle section to 230 to 260° C., and cooling the lower section to 90 to 120° C.; scrubbing and condensing vapors departing from the separating stages of the upper and lower sections with fatty acid to get mixed fatty acid distillate; indirectly heating a batch in a first separating stage in the stripping column middle section; and condensing that batch from separation stages vapors of the stripping column middle section and fractionating selectively into a first and second fatty acid phase, respectively rich and poor in sterols and tocopherols.

20 Claims, 1 Drawing Sheet

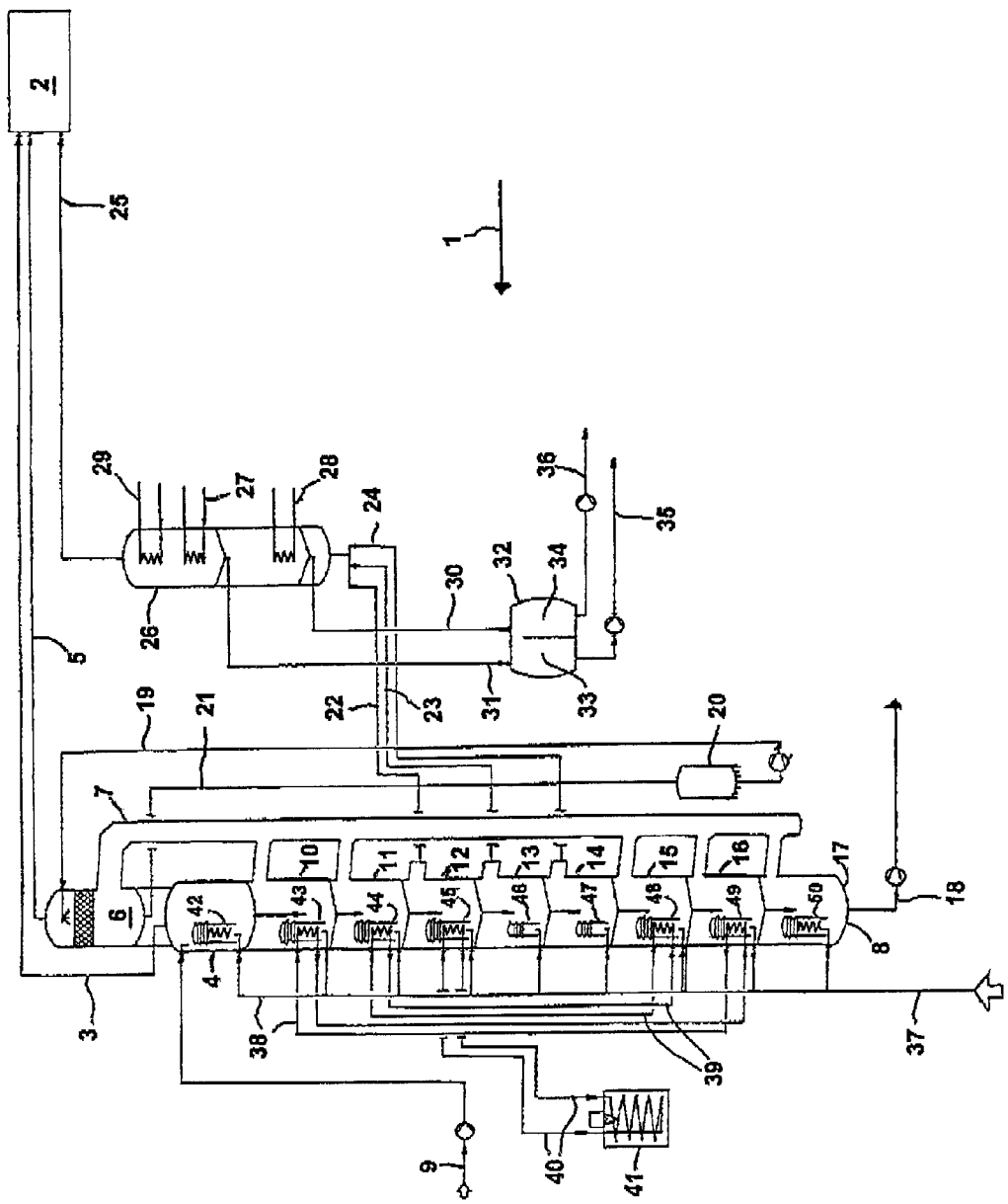

PROCESS FOR DEODORIZING EDIBLE OIL

CROSS REFERENCE TO RELATED APPLICATIONS

This application is a U.S. National Phase application under 35 U.S.C. §371 of International Application No. PCT/DE2010/001522, filed on Dec. 24, 2010, and claims benefit to German Patent Application No. DE 10 2010 009 579.6, filed on Feb. 26, 2010. The International Application was published in German on Sep. 1, 2011 as WO 2011/103846 A1 under PCT Article 21(2).

FIELD

To improve the quality of edible oils, the same are subjected to a deodorizing treatment by which odorous and flavoring substances can be removed from edible oil by means of steam distillation under vacuum; in the process, the low-volatility and lipid-soluble substances are eliminated by evaporation. The odorous and flavoring substances are present in the condensate of the deodorizing vapors. In the distillate those substances are contained, which at normal temperature and normal pressure are non-volatile and insoluble in water, as well as edible oil entrained during the deodorization. Fatty acids, sterols and tocopherols are of practical importance; the latter have an influence on the oxidation stability of the edible oils and therefore are utilized as antioxidants in foodstuffs. As provitamins, these substances also play a physical role, since the tocopherols are converted into vitamin E and the sterols into vitamin D. The sterols and tocopherols specifically obtained from the distillate therefore are used as raw material in the pharmaceutical industry and in the food industry.

BACKGROUND

The technical deodorization of edible oil is performed both in a semi-continuous and in a fully continuous operation. In the semi-continuous operation, a distillation column is divided into at least five stages to be shut off against each other, which have a capacity of 5 to 8, preferably 7 t per stage. Each stage is equipped with a heating or cooling coil and supply conduits for injection steam (stripping steam). The stages have a common vapor discharge conduit, which is connected to a vacuum generating conduit via a vapor scrubber. By heating with high-pressure steam, a temperature of 240 to 260° C. is adjusted in the distillation column at a vacuum of 1.3 to 2.6 mbar and at a retention time of 20 to 40 min per stage, in dependence on the operating temperature. The flow of the edible oil through the distillation column is controlled automatically according to specified retention times. The batch of edible oil to be treated is supplied to the first stage, in which degassing and in part heating takes place. Thereupon, the edible oil passes into the second stage in which it is brought to the temperature of 240 to 260° C., at these temperatures flows through the third and fourth stages, and then passes into the fifth stage acting as cooling stage, in which cooling down to a temperature of about 100° C. is effected. The vapors discharged from the stages are collected in the vapor discharge conduit and passed into a vapor scrubber in which the vapors are constantly washed with circulating and sprayed fatty acid. In the vapor scrubber, the major part of the entrained organic substances is accumulated in a mixture of free fatty acids, sterols and tocopherols. The deodorized edible oil is withdrawn from the bottom of the stage acting as cooling stage (Singer, M.: Gewinnung und Verarbeitung der pflanzlichen Fette und Ole; Verlag für chemische Industrie, H. Ziolkowsky K G, Augsburg 1992, pp. 234-238). The disadvantage of this process consists in that the fatty acid obtained during the deodorization cannot be condensed in pure-grade form.

SUMMARY

An embodiment of the invention provides process for deodorizing edible oil by a semi-continuously operating steam distillation plant, comprising a stripping column with a plurality of separating stages configured to be shut off against each other, which are arranged therein, a degassing stage upstream of the stripping column and a downstream vapor scrubber, a vacuum generating plant connected with the degassing stage, the separating stages, and the vapor scrubber, one supply conduit each for stripping steam, which opens into the degassing stage and the separating stages, indirect heat exchanger surfaces each arranged in the separating stages of the upper and the lower portion of the stripping column, and a vapor discharge conduit opening into the vapor scrubber, which is connected with the separating stages arranged in upper and lower portions of the stripping column, the process comprising: (i) first, generating a vacuum of 2 to 7 mbar in the distillation plant; (ii) filling the degassing stage with a batch of feedstock edible oil; (iii) automatically passing the batch through the degassing stage and the separating stages, one after the other, after predetermined retention times of 20 to 40 min per stage controlled in dependence on performance; (iv) preheating the batch in the degassing stage with stripping steam to a temperature of 75 to 80° C., to obtain a preheated batch; (v) heating up the preheated batch to a temperature of 150 to 180° C. in the separating stages of the upper portion of the stripping column; (vi) heating up the preheated batch in the separating stages of a middle portion of the stripping column to a temperature of 230 to 260° C.; (vii) heating up the preheated batch in the separating stages of the lower portion of the stripping column is cooled down to a temperature of 90 to 120° C.; (viii) washing and condensing vapors discharged from the separating stages of the upper and the lower portion of the stripping column in the vapor scrubber with circulating sprayed fatty acid, to obtain a fatty acid mixed distillate; (ix) indirectly heating at least the batch present in a downstream first separating stage of the middle portion of the stripping column with high-pressure steam; (x) indirectly cooling vapors discharged from the separating stages of the middle portion of the stripping column at least two condensation stages; and (xi) fractionating in pure-grade form, condensed vapors, from the indirectly cooling (x), into a first fatty acid phase rich in sterols and tocopherols and a second fatty acid phase poor in sterols and tocopherols.

An embodiment of the present invention provides the above-described, semi-continuously operated process for deodorizing edible oils such that a fatty acid phase rich in sterols and tocopherols and a fatty acid phase poor in sterols and tocopherols can be obtained separate from each other.

BRIEF DESCRIPTION OF THE DRAWINGS

FIG. 1 illustrates an exemplary embodiment of a facility for conducting a process according to the invention.

DETAILED DESCRIPTION

An object of the invention is solved in that at least the batch present in the downstream first separating stage of the middle portion of the stripping column is heated indirectly and the vapors discharged from the separating stages of the middle portion of the stripping column are indirectly cooled in at least two condensation stages and fractionated in pure-grade form, wherein in a first condensation stage a fatty acid phase rich in sterols and tocopherols and in a second condensation stage a fatty acid phase poor in sterols and tocopherols are condensed. The vapors containing most of the fatty acids, sterols and tocopherols are obtained in the separating stages present in the middle portion of the stripping column, are collected and supplied to the condensation stages in which the vapors are indirectly cooled with tempered cooling water each by means of a plate-type heat exchanger. In addition, it is possible to pass the remaining vapors over a condensation stage acting as cold trap, preferably over a plate-type heat-exchanger, in order to liberate the vapors from entrainments of edible oil, which cause an undesired load of the vacuum generating plant. The plate-type heat exchangers are cooled separate from each other, preferably with tempered cooling water. A particular advantage must be seen in that the semi-continuously operated distillation plant provides for a grade change when charging the edible oil without interruption of the deodorizing process, since the distillation plant need not be drained. Both the vapor discharge of the individual separating stages and the number of the condensation stages can be varied, so that a pure-grade condensation is ensured for successive batches. Depending on the number of the different feedstock edible oils, a corresponding number of recipient tanks are provided with one chamber each for the fatty acid phase rich in sterols and tocopherols and the fatty acid phase poor in sterols and tocopherols.

The control of the deodorizing process can be effected by means of a process control system, by which the individual process steps can be controlled and monitored automatically.

According to a particular feature of the invention, the distillation plant is charged with at least two batches of the same edible oil in succession, in order to achieve the preparation of pure-grade fatty acid phases even in case of a change of the edible oil to be deodorized.

A preferred embodiment of the invention consists in that the separating stages of the lower portion of the stripping column are connected with the separating stages of the upper portion via heat tubes, so that heat produced in the separating stages of the lower portion of the stripping column can be transferred to the edible oil batches present in the separating stages of the upper portion of the stripping column by indirect heat transfer. In the middle portion of the stripping column, at least the batch present downstream in the first separating stage is heated indirectly with high-pressure steam preferably generated in a natural-circulation boiler.

According to another feature of the invention, the edible oil is cooled indirectly in the downstream last separating stage of the stripping column.

Further features, advantages and possible applications of the process according to the invention can be taken from the following description of an exemplary embodiment in conjunction with the process flow diagram shown in the drawing. All features described and/or illustrated form the subject-matter of the invention per se or in any combination, independent of their inclusion in the claims or their back-reference.

Reference is made to the drawing, FIG. 1.

After the required vacuum has been generated in the semi-continuously operating steam distillation plant (1) by means of the vacuum generating plant (2), which via conduit (3) is connected to the degassing stage (4) and via conduit (5) to the vapor scrubber (6) and to the vapor discharge conduit (7) of the stripping column (8), the degassing stage (4) is filled with a batch of 6 t of rape-seed oil supplied via conduit (9), which contains 1.5 wt-% of fatty acid and 1000 ppm each of tocopherols and sterols, and preheated to a temperature of 80° C. in the degassing stage (4). Thereafter, the automatic operation of the distillation plant (1) is started, wherein after leaving the degassing stage (4) each batch one after the other traverses the separating stages (10, 11, 12, 13, 14, 15, 16, 17) of the stripping column (8). After a retention time of 23 min per separating stage, the rape-seed oil is drained into the respectively succeeding separating stage within 2 to 3 min by automatically opening the bottom valve. A corresponding lock in the control of the bottom valves ensures that draining will only be effected when the next separating stage has been drained completely.

In the first separating stage (10), the rape-seed oil is heated to a temperature of 110° C., in the succeeding separating stage (11) to a temperature of 150° C. and in the following separating stage (12) to an end temperature of 250° C. The end temperature of 250° C. is maintained in the following two separating stages (13, 14). In the subsequent separating stages (14, 16, 17) the temperature of the rape-seed oil first is lowered to 210° C., then to 160° C. and thereafter to 100° C., wherein in the last separating stage (17) the rape-seed oil is indirectly cooled with cooling water, thereby generating hot water. From the bottom of the last separating stage (17) completely deodorized rape-seed oil is withdrawn via conduit (18) and discharged from the process.

The vapors formed in the separating stages (10, 11, 15, 16, 17) and discharged into the vapor discharge conduit (7) via lateral outlets are charged to the vapor scrubber (6) and condensed therein to obtain a fatty acid mixed distillate, by directly cooling the vapors with fatty acid mixed distillate supplied from the heat exchanger (20) via conduit (19), which is withdrawn from the vapor scrubber (6) and flows into the heat exchanger (20) via conduit (21). The vapors flowing off from the separating stages (12, 13, 14) of the middle portion of the stripping column (8) are supplied via conduits (22, 23, 24) to the separate cold trap (26) connected with the vacuum generating plant (2) via conduit (25), in which cold trap the vapors are cooled indirectly with cooling water having a temperature of 55 to 65° C. by means of a first plate-type heat exchanger (27) to a temperature of 130° C. at a pressure of 1.8 mbar[a] and by means of a second plate-type heat exchanger (28) to a temperature of 70° C. at a pressure of 1.6 mbar[a], wherein in the first plate-type heat exchanger (27) most of the fatty acid together with the sterols and tocopherols and in the second plate-type heat exchanger (28) the remaining fatty acid is condensed. In a third plate-type heat exchanger (29), which is charged with cooling water having a temperature of 40 to 50° C., the short-chain fatty acids possibly still present in the vapors are separated at a temperature of 55° C. and a pressure of 1.5 mbar[a], so that almost exclusively steam is sucked off via conduit (25). The fractions condensed in the plate-type heat exchangers (27, 28) are discharged via conduits (30, 31) and separately stored in the recipient tank (32) in the chambers (33, 34), from where the two fractions are separately pumped into a non-illustrated customer tank farm via conduits (35, 36).

Via conduit (37), stripping steam is introduced into the batch each present in the separating stage and the degassing stage via one separating stage (10, 11, 12, 13, 14, 15, 16, 17) each and one side conduit branching off for the degassing stage (4), and the batch is heated, so that the more volatile components of the batches are stripped and discharged with the vapors.

In addition, the batches present in the separating stages (10, 11) located in the upper portion of the distillation column (8) are heated with heat obtained from the separating stages (15, 16) arranged in the lower portion of the distillation column (8) by indirect heat transfer according to the operating principle of a thermosiphon. The closed tubes (38, 39), so-called heat tubes, each are filled with a working medium, which fills up the hermetically encapsulated volume for a minor part in the liquid condition and for a major part in the vaporous condition. The same includes one heat transfer surface each for the heat source (heating zone) and the heat sink (cooling zone). During the heat input into the heating zones of the separating stages (15, 16), the working medium starts to evaporate and the steam formed flows in direction of the cooling zone, where the steam is condensed due to the comparatively lower temperature. The latent heat previously absorbed in the separating stages (15, 16) is released again in the separating stages (10, 11). The working medium now liquid again returns into the separating stages (15, 16) by gravity, wherein expediently the separating stage (16) is connected with the separating stage (10) via the heat tube (38) and the separating stage (15) is connected with the separating stage (11) via the heat tube (39). In the separating stage (12) mounted in the middle portion of the stripping column (8), the batch is heated to an end temperature of 245° C. by indirect heat transfer with high-pressure steam generated in the heating means (41), which is supplied via the cycle conduit (40).

The circulation of the batches in the stages (4, 10, 11, 12, 13, 14, 15, 16, 17) of the stripping column (8) each is effected by a circulating apparatus (42, 43, 44, 45, 46, 47, 48, 49, 50) functioning according to the operating principle of an air-lift pump with the result of an effective heat transfer and an effective stripping by the supplied stripping steam.

The advantages achieved with the process according to the invention in particular must be seen in that a largely pure-grade distillation fatty acid and a fraction enriched with tocopherols and sterols can be produced, wherein different grades of edible oil can easily be processed one after the other without mixing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

The invention claimed is:

1. A process for deodorizing edible oil by a semi continuously operating steam distillation plant, comprising a stripping column with a plurality of separating stages configured to be shut off against each other, which are arranged therein, a degassing stage upstream of the stripping column and a downstream vapor scrubber, a vacuum generating plant connected with the degassing stage, the separating stages, and the vapor scrubber, one supply conduit each for stripping steam, which opens into the degassing stage and the separating stages, indirect heat exchanger surfaces each arranged in the separating stages of the upper and the lower portion of the stripping column, and a vapor discharge conduit opening into the vapor scrubber, which is connected with the separating stages arranged in upper and lower portions of the stripping column, the process comprising:
   (i) first, generating a vacuum of 2 to 7 mbar in the distillation plant;
   (ii) filling the degassing stage with a batch of feedstock edible oil;
   (iii) automatically passing the batch through the degassing stage and the separating stages, one after the other, after predetermined retention times of 20 to 40 min per stage controlled in dependence on performance;
   (iv) preheating the batch in the degassing stage with stripping steam to a temperature of 75 to 80° C., to obtain a preheated batch;
   (v) heating up the preheated batch to a temperature of 150 to 180° C. in the separating stages of the upper portion of the stripping column, to obtain a first heated portion;
   (vi) heating up the first heated portion in the separating stages of a middle portion of the stripping column to a temperature of 230 to 260° C., to obtain a second heated portion;
   (vii) cooling the second heated portion in the separating stages of the lower portion of the stripping column to a temperature of 90 to 120° C.;
   (viii) washing and condensing vapors discharged from the separating stages of the upper and the lower portion of the stripping column in the vapor scrubber with circulating sprayed fatty acid, to obtain a fatty acid mixed distillate;
   (ix) indirectly heating at least the hatch present in a downstream first separating stage of the middle portion of the stripping column with high-pressure steam;
   (x) indirectly cooling vapors discharged from the separating stages of the middle portion of the stripping column in at least a first condensation stage, a second condensation stage, and a third condensation stage; and
   (xi) fractionating in pure-grade form, condensed vapors, from the indirectly cooling (x), into a first fatty acid phase rich in sterols and tocopherols and a second fatty acid phase poor in sterols and tocopherols,
   wherein, in the third condensation stage, edible oil droplets entrained by the vapors are separated off.

2. The process of claim 1, wherein the distillation plant is charged with at least two batches of the same feedstock edible oil in succession.

3. The process of claim 1, wherein the first fatty acid phase is condensed in a first condensation stage, and
   wherein the second fatty acid phase is condensed in a second condensation stage.

4. The process of claim 3, wherein surface heat exchangers are used as condensation stages for the vapors.

5. The process of claim 4, wherein the surface heat exchangers are cooled separate from each other.

6. The process of claim 1, further comprising:
indirectly transferring heat obtained by indirect heat transfer from the preheated hatches present in the separating stages of the lower portion of the stripping column to the preheated batches present in the separating stages of the upper portion of the stripping column.

7. The process of claim 1, wherein, of the batches present in the separating stages of the middle portion of the stripping column, at least the batch present in the downstream first separating stage is indirectly heated with high-pressure steam.

8. The process of claim 1, comprising indirectly cooling a batch present in a downstream last separating stage of the stripping column.

9. The process of claim 4, wherein the surface heat exchangers are cooled with tempered cooling water.

10. The process of claim 1, wherein the heating in (v) and (vi) is gradual.

11. The process of claim 1, wherein the cooling in (vii) is gradual.

12. The process of claim 1, wherein the heating in (v) and (vi) is gradual, and
wherein the cooling in (vii) is gradual.

13. The process of claim 1, wherein the second fatty acid phase is substantially free of sterols and tocopherols.

14. The process of claim 1, wherein the second fatty acid phase is free of sterols and tocopherols.

15. The process of claim 1, wherein vapors comprising most of the fatty acids, sterols, and tocopherols are obtained in the separating stages present in the middle portion of the stripping column.

16. The process of claim 1, wherein batches present in the separating stages located in the upper portion of the distillation column are heated with heat obtained from the separating stages.

17. The process of claim 1, further comprising:
changing a product grade of the edible oil when charging the edible oil without interruption of the deodorizing process.

18. The process of claim 1, further comprising:
changing a product grade of the edible oil without draining the distillation plant.

19. The process of claim 1, wherein control of the deodorizing process is effected using a process control system, by which individual process steps can be controlled and monitored automatically.

20. The process of claim 1, wherein the first, second, and third condensation stages are within one cold trap, separate from the stripping column.

* * * * *